United States Patent [19]
Benson et al.

[11] Patent Number: 5,808,610
[45] Date of Patent: Sep. 15, 1998

[54] METHOD AND SYSTEM OF DOCKING PANELS

[75] Inventors: Doug Benson, Plano; Keith Bottner, Richardson; Michael Froman, Allen; Scott Thompson, Plano, all of Tex.

[73] Assignee: Macromedia, Inc., San Francisco, Calif.

[21] Appl. No.: 697,671

[22] Filed: Aug. 28, 1996

[51] Int. Cl.$^6$ ........................................... G06F 3/14
[52] U.S. Cl. ...................... 345/342; 345/346; 345/340
[58] Field of Search ................... 345/342, 340, 345/346, 356, 339, 334, 348, 350, 347, 975

[56] References Cited

U.S. PATENT DOCUMENTS

| | | | |
|---|---|---|---|
| 4,931,783 | 6/1990 | Atkinson | 345/342 X |
| 5,243,697 | 9/1993 | Hoeber et al. | 345/334 |
| 5,367,623 | 11/1994 | Iwai et al. | 345/350 |
| 5,528,744 | 6/1996 | Vaughton | 345/340 |
| 5,572,649 | 11/1996 | Elliott et al. | 345/340 |
| 5,596,700 | 1/1997 | Darnell et al. | 345/340 |
| 5,644,737 | 7/1997 | Tuniman et al. | 345/348 X |

*Primary Examiner*—Raymond J. Bayerl
*Attorney, Agent, or Firm*—Fulbright & Jaworski L.L.P.

[57] ABSTRACT

A computer program displaying a plurality of panels on the display of a computer system. Each panel contains one or more sets of tools, commands, and information displays that can be used to modify the contents of a window or document within the computer system. The panels can be docked by dragging a first panel and dropping it in proximity with a second panel while holding down a modifier key. When the panels are docked, a docking wedge is created between the panels. Docked panels can be moved as if the panels were a single panel. In addition, docked panels can be reduced in size by pressing a minimize button on any one of the docked panels. Panels can be undocked by either pressing the docking wedge or dragging a panel while holding down a modifier key. In response to either method of undocking, the docking wedge is removed and the panels become separate.

42 Claims, 5 Drawing Sheets

METHOD AND SYSTEM OF DOCKING PANELS

BACKGROUND OF THE INVENTION

Graphical user interfaces (GUIs), such as those found on computers using the MACINTOSH™ Operating System or MICROSOFT WINDOWS™, have long used menu bars and dialogue boxes to control the operation of application programs. A menu bar is a strip of menu choices, such as "Edit," usually arranged along the top of a screen or window. A dialogue box, often generated in response to a menu choice, is a window that prompts a user for information. Usually, the user closes the dialogue box once the command is complete.

The menu bar and dialogue box interface, however, is cumbersome when used for performing frequently used commands. For example, if the user makes frequent changes to the style of text in a document, the user must choose a menu choice and respond to a dialogue box for each change. These repetitive tasks can be costly in terms of time and effort.

Accordingly, more advanced GUIs display "panels" containing tools, commands, and information displays used for modifying a document. A panel is a small floating window that can be opened from a menu. Panels usually have a header bar that can be used to move the panel around the screen. Panels persist until the panels are explicitly closed.

Multiple open panels, however, can occupy large amounts of screen space and block the underlying document. To minimize the amount of space occupied by panels, advanced GUIs use "tabs." Tabs allow the functionality of different panels to be stacked within a single panel, with each item in the stack identified by a tab. To choose a particular functionality within a panel, the user merely selects a tab identifying that functionality. The selected functionality rises to the top of the stack and is displayed within the panel. In addition, a tab can be dragged from one panel to another.

A problem with tabs is that only a single tab's functionality can be displayed by a panel at one time. As a result, the user is often required to keep multiple panels displayed simultaneously. Therefore, tabs do not solve the problem of having panels clutter up the screen.

Accordingly, there is a need in the art for an efficient way to move panels on the screen.

There is a further need in the art for an efficient way to organize panels on the screen.

There is a further need in the art for a way to display panels that minimizes the amount of screen covered by the panels.

There is a further need in the art for a way to minimize multiple panels as a single block.

There is a further need in the art for a way to link multiple panels having similar uses.

SUMMARY OF THE INVENTION

The above and other needs are met by a method and system for displaying and organizing panels that allows panels to be "docked." Docked panels act as a single unit. Thus, docked panels can be opened, closed, or moved around the screen with a single command.

A user can dock a panel to another by dragging the first panel in proximity to the second panel while holding down a modifier key. When the first panel is released, a docking wedge is created between the two panels and the first panel snaps into a docked position on the docking wedge. Panels may be docked in any configuration. Panels are undocked by either pressing the docking wedge or dragging a panel's header bar while holding down the modifier key.

Docked panels may be opened, closed, or moved as a single unit. In addition, resizable panels can still be resized while docked. When a docked panel is resized, the configuration of the docked panels automatically changes as necessary to prevent the docked panels from overlapping.

Furthermore, docked panels can be zipped and unzipped as a single unit. When the minimize button on the header bar of a docked panel is pressed, panels are reduced so that only the panels' tabs are displayed. If a panel does not have tabs, then only the header bar is displayed. Also, the docking wedge is not displayed. In order to minimize screen clutter, zipped panels are automatically moved to the upper left corner of an imaginary bounding box surrounding the panels before the panels were minimized. Panels are unzipped by again pressing the minimize button. When unzipped, docked panels move back to the same screen position as before the panels were zipped.

A technical advantage of the present invention is that multiple panels can be combined into a single unit while still maintaining each panel as a discrete unit.

Another technical advantage is that the panels can be docked in any configuration desired by the user.

Another technical advantage is that the docked panels can be manipulated as a single unit.

A corresponding technical advantage is that docked panels can easily be split into separate panels.

Another technical advantage is that multiple panels can be zipped or unzipped with a single command.

Another technical advantage is that tabs can still be used in docked panels and dragged among panels.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 6 illustrates a screen display showing zipped panels.

DESCRIPTION OF THE PREFERRED EMBODIMENTS

Figure 1:
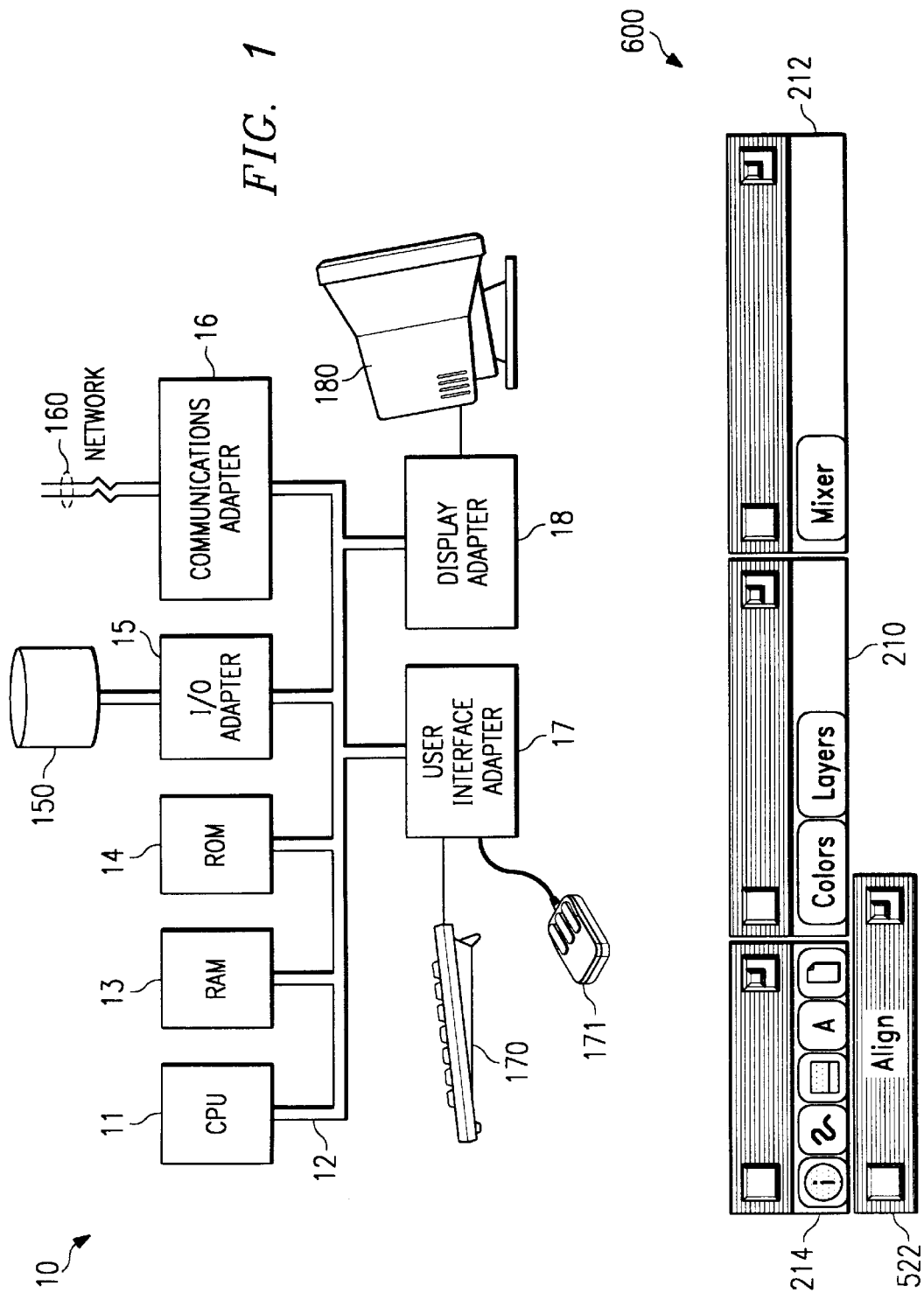
FIG. 1 illustrates a high-level block diagram of a computer system adapted to execute the present invention.

FIG. 1 illustrates computer system 10 adapted to execute the present invention. Central processing unit (CPU) 11 is coupled to bus 12, which in turn is coupled to random access memory (RAM) 13, read only memory (ROM) 14, input/output (I/O) adapter 15, communications adapter 16, user interface adapter 17, and display adapter 18.

CPU 11 may be any general purpose CPU, such as an Intel x86 compatible, Motorola 680x0, or PowerPC compatible CPU. However, the present invention is not restricted by the architecture of CPU 11.

RAM 13 and ROM 14 hold user and system data and programs as is well known in the art. I/O adapter 15 connects storage devices, such as hard drive 150, to the computer system. Communications adaptor 16 couples the computer system to a local or wide-area network 160. User interface adapter 17 couples user input devices, such as keyboard 170 and pointing device 171, to the computer system. Pointing device 171 may be a mouse, track ball, stylus and pressure sensitive pad, or other device allowing a user to control a cursor. This discussion assumes that certain well known user interface commands, such as drag and drop, are implemented using pointing device 171.

Finally, display adapter 18 is driven by CPU 11 to control the display on display device 180. As is well known in the art, subsequent figures representing screen displays are typically displayed on display device 180. Display device 180 may be a standard CRT monitor, a LCD or LED screen, or any other device capable of displaying data to a user. As is also well known in the art, a computer program embodying the present invention preferably resides on hard drive 150 and executes on CPU 11.

Figure 2:
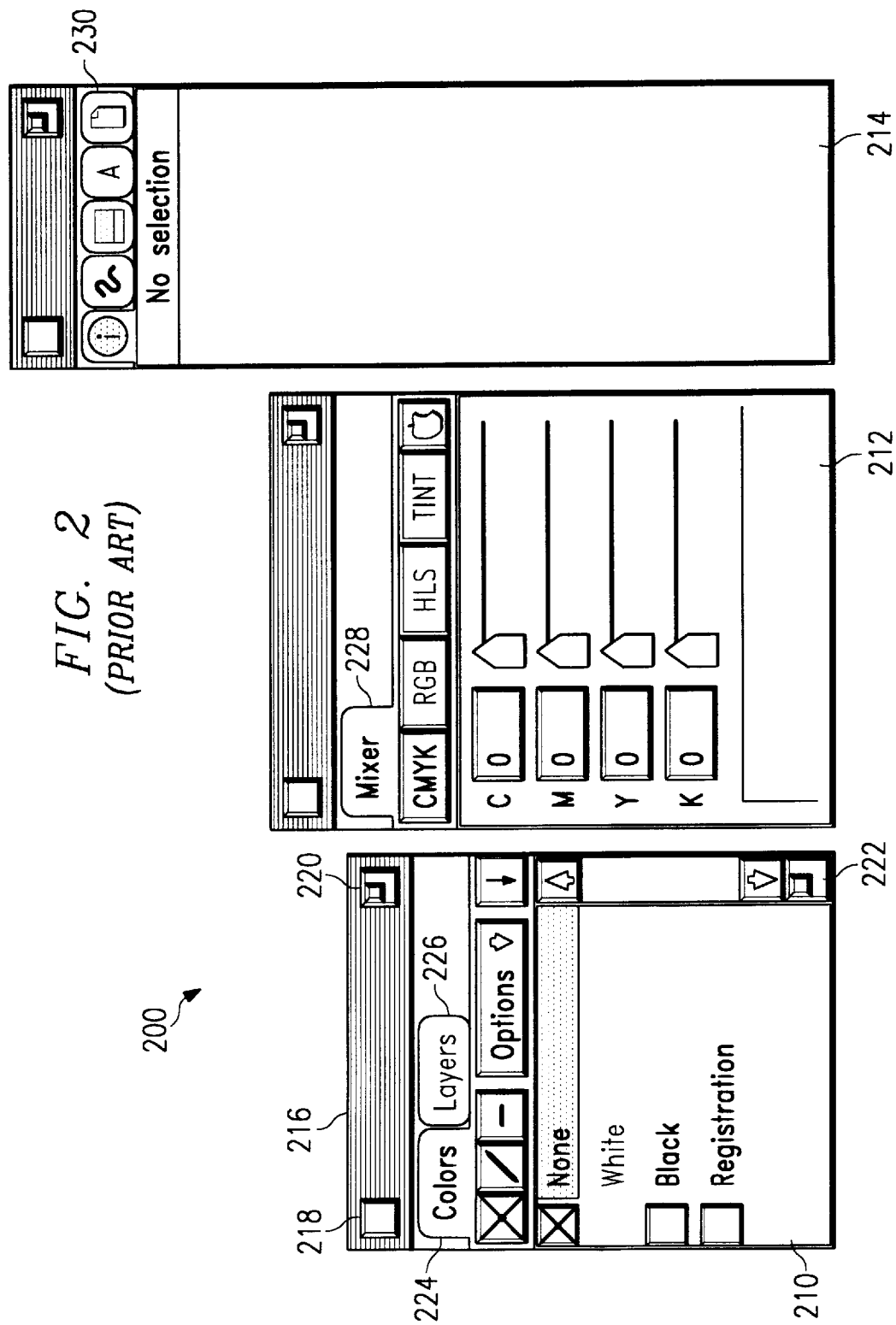
FIG. 2 illustrates a prior art screen display showing panels.

FIG. 2 illustrates a prior art display on display device 180. Shown are three panels, 210, 212, 214. All three panels 210, 212, 214 contain well known user interface controls. Panel 210, for example, has a header bar 216, also known as a title bar when it includes text, that can be used to drag (move) the panel. Since panel 210 can have multiple purposes, header bar 216 is blank. If panel 210 had a dedicated purpose, then header bar 216 would display a title indicating that purpose.

Within header bar 216 are close button 218 and minimize button 220. When selected, close button 218 closes the panel and removes it from the display. Minimize button 220, when selected, zips the panel as described above. Panel 210 also contains resize button 222, which is used to resize the panel. A panel's default size is determined by the size of the tabs it contains. If a tab is not resizable or has a minimum size, then that tab's size will constitute the minimum size for that panel.

Within panel 210 are two tabs 224, 226 labelled "Colors" and "Layers," respectively. Colors tab 224 is currently selected and, accordingly, the colors commands and controls are presented within panel 210. If layers tab 226 were selected, that tab 226 would rise to the top and the layers commands and controls would be displayed within panel 210.

Panel 212, unlike panel 210, only has a single tab 228 labelled "Mixer." Since mixer tab 228 is not resizable, panel 212 does not have a resize button. Panel 214 has multiple tabs 230. Panel 214's tabs 230 have graphic labels, rather than the text labels found in the other panels.

Any tab can be dragged to another panel and placed within that panel. For example, colors tab 224 can be dragged from panel 210 and dropped within panel 214. If a tab is dropped when it is not over a panel, then a new panel is automatically created having that tab as the panel's sole tab.

To dock two or more panels, the user drags a first panel while holding down a modifier key, such as "control" or "command," or a particular pointing device button. If the user drops the first panel within a predetermined proximity to a second panel, then the first panel docks with the second panel and a docking wedge is created. Preferably, the user must drop the first panel within 12 pixels of the second panel for the panels to dock. In such a case, the first panel will "snap" to the side of a docking wedge which will be created between the panels.

Figure 3:
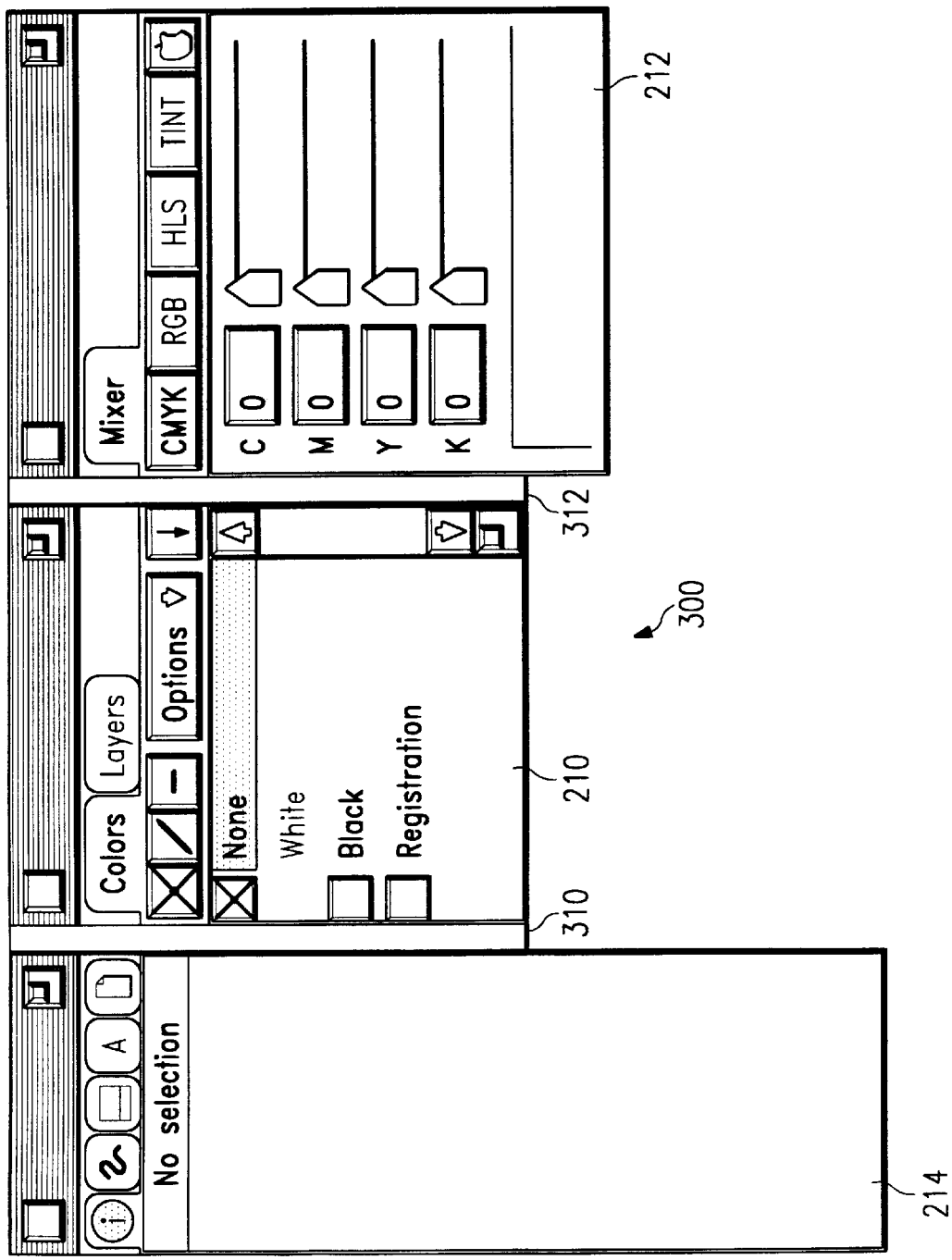
FIG. 3 illustrates a screen display showing docked panels.

FIG. 3 illustrates a screen display 300 showing the panels 210,212,214 of FIG. 2 after the panels have been docked. The panels 210,212,214 are identical to those of FIG. 2, except that docking wedges 310, 312 have been placed between the panels. The docking wedges 310, 312 are thin buttons that provide a visual reminder that the panels are docked and are used to undock the panels as described below.

Figure 4:
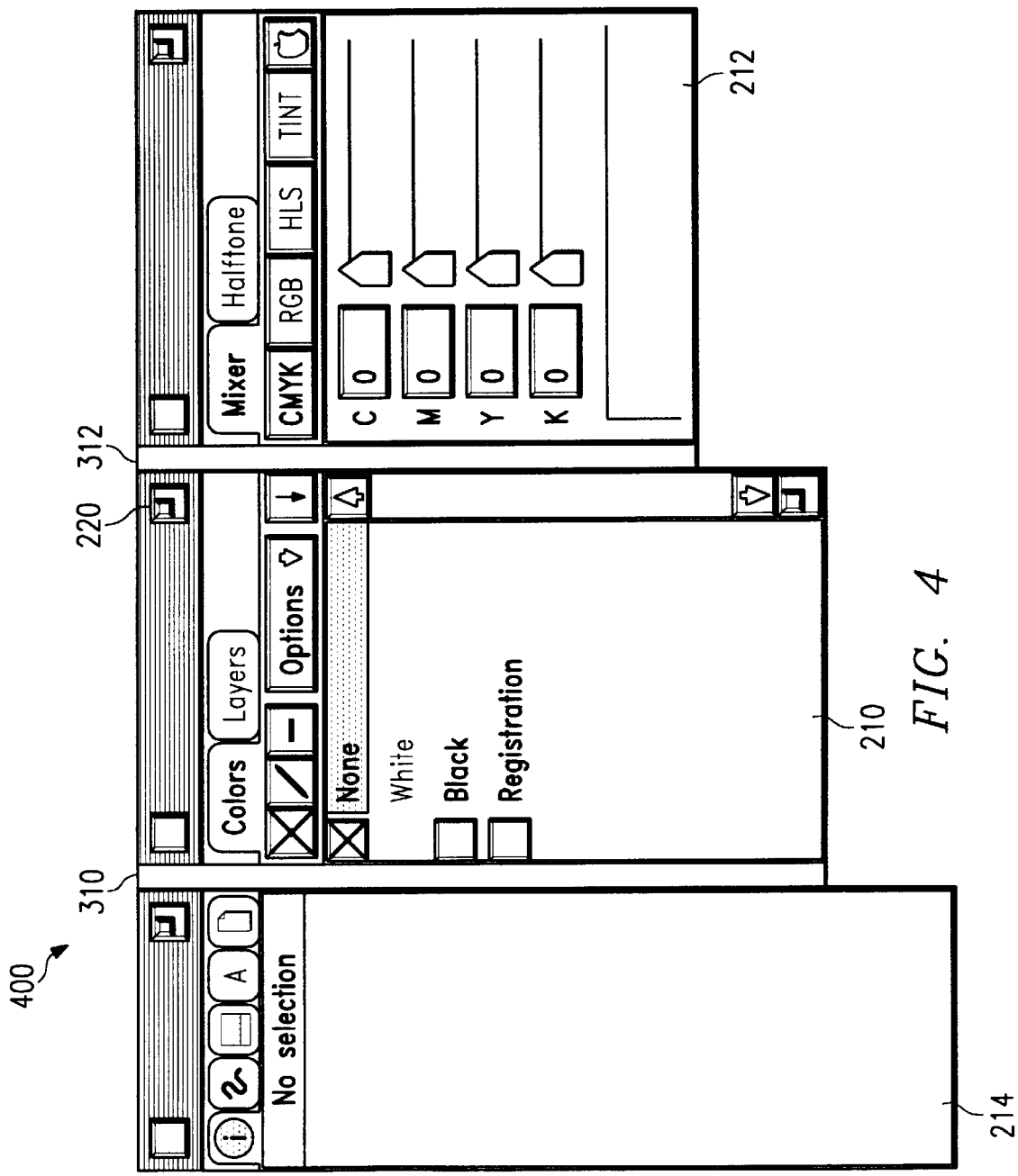
FIG. 4 illustrates the screen display of FIG. 3 after a panel has been resized.

If a docked panel is resized, moreover, the other panels and docking wedges will automatically reconfigure to assure that the docked panels and docking wedges do not overlap. FIG. 4 is a screen display 400 showing screen display 300 after panel 210 has been resized. Panel 210 has been enlarged. Accordingly, docking wedges 310 and 312 are automatically enlarged to match the new shape of panel 210.

Figure 5:
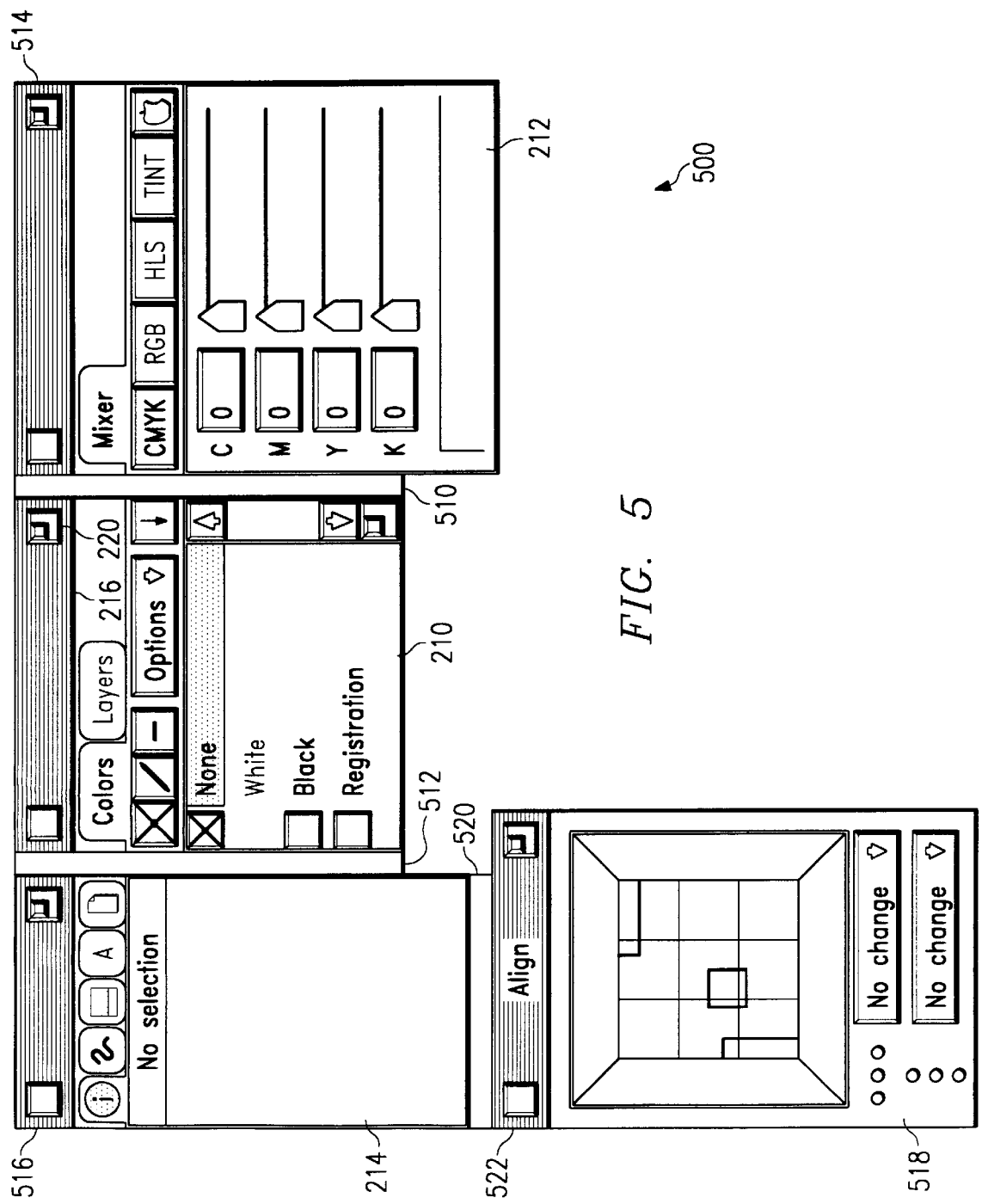
FIG. 5 illustrates a screen display showing an alternate configuration of docked panels.

Similarly, FIG. 5 illustrates a screen display 500 showing an alternate configuration of docked panels. In this configuration, panel 212 is docked on the right of panel 210 and connected by docking wedge 510. Likewise, panel 210 is docked on the right of panel 214 by docking wedge 512. An additional panel 518 is docked on the bottom of panel 214 by docking wedge 520.

Once docked, the panels behave as a single unit. Thus, the docked panels can be moved by dragging any one of the panels' header bars 216,514,516,522. In addition, docked panels can be "zipped" as a single unit. If the user presses a docked panel's minimize button 220, then all of the docked panels will zip up. That is, panels containing tabs are reduced to a header bar and tabs. Panels not having tabs are reduced to only a title bar. In addition, the docking wedges are not displayed. Moreover, the zipped panels automatically are repositioned at the upper left corner of an imaginary bounding box surrounding the panels before the panels were minimized.

FIG. 6 illustrates a screen display 600 showing the screen display 500 of FIG. 5 after the panels 210,212,214,518 have been zipped. Note that only the header bars and tabs of panels 212, 214, and 216 are displayed. Panel 518, in contrast, does not have any tabs. Therefore, only the title bar 522 of panel 518 is displayed.

Panels are unzipped by pressing a docked panel's minimize button 220. Then, all of the zipped panels are restored to their former size and screen location. In addition, the docking wedges are redisplayed.

To undock a panel, the user can either click on a docking wedge or hold down a modifier key while dragging a panel's header bar. If the user selects a docking wedge, then that wedge will disappear and the panel docked via that wedge will become undocked. Similarly, if the user drags a docked panel while holding down a modifier key, the docking wedge holding that panel will disappear and the panel will become undocked.

Consider, for example, the docked configuration shown in FIG. 5. The user can undock panel 212 by either clicking on docking wedge 510 or holding down a modifier key while dragging panel 212 via header bar 514. In either case, docking wedge 510 will disappear but docking wedge 512 will remain. Thus, panel 212 will become undocked, but panels 210 and 214 will remain docked.

Note that it is possible for the docked configuration of FIG. 5 to be positioned on the display so that panels 210 and 212 are off the right edge of the display and only panels 214 and 518 are visible. If the user undocks panel 214 while panels 210 and 212 are not visible, then panels 210 and 212 will automatically move back onto the visible area of the screen. Accordingly, it is impossible for panels to get lost off the edge of the screen.

Although the present invention and its advantages have been described in detail, it should be understood that various changes, substitutions and alterations can be made herein without departing from the spirit and scope of the invention as defined by the appended claims.

What is claimed is:

1. A method of docking a first panel to a second panel, the first and second panels displayed on a display of a computer system, the method comprising the steps of:

dragging the first panel towards the second panel;

dropping the first panel within a predetermined distance of the second panel; and coupling the first panel to the second panel, wherein the first and second panels are both fully visible when coupled.

2. The method of claim 1, further comprising the step of:

moving the first panel when the first and second panels are coupled; and automatically moving the second panel in correspondence to the movement of the first panel.

3. The method of claim 1, further comprising the step of:

uncoupling the first panel from the second panel.

4. The method of claim 3, wherein the uncoupling step comprises the step of:

selecting a docking wedge disposed between the first and second panels.

5. The method of claim 3, wherein the uncoupling step comprises the step of:

selecting a modifier key coupled to the computer system; and dragging the first panel concurrent with the selection of the modifier key.

6. The method of claim 3, wherein the uncoupling step comprises the step of:

moving the second panel to a visible location.

7. The method of claim 1, further comprising the steps of:

selecting a minimize button on the first panel; and reducing the first and second panels in size in response to the selection, wherein a reduced representation of each of the first and second panels is displayed.

8. The method of claim 7, wherein said reducing step comprises the step of:

automatically moving the reduced first and second panels to a different location.

9. The method of claim 1, wherein the coupling step further comprises the step of:

disposing a docking wedge between the first and second panels.

10. The method of claim 1, wherein the dragging step comprises the steps of:

selecting a modifier key coupled to the computer system; and selecting a header bar of the first panel while the modifier key is selected.

11. The method of claim 1, wherein the predetermined distance is measured by pixels.

12. The method of claim 11, wherein the predetermined distance is 12 pixels.

13. A computer system having a display displaying a plurality of panels, the computer system comprising:

means for docking a first panel having a header bar and a minimize button with a second panel and displaying a docking wedge therebetween;

means for dragging the docked panels via the header bar;

means for zipping the panels when the minimize button is selected, the zipped panels including a zipped representation of the first panel and a zipped representation of the second panel; and means for undocking the panels when the docking wedge is selected.

14. The system of claim 13, further comprising:

means for resizing the first panel; and means for reconfiguring the docking of the first panel and the second panel in response to the resizing, wherein reconfiguring of the docking of the resized first panel and the second panel results in the docked panels and the docking wedge not overlapping.

15. The system of claim 14, wherein said reconfiguring means comprises:

means for automatically adjusting the docking wedge according to the new shape of the resized first panel.

16. The system of claim 13, wherein the means for undocking comprises:

means for removing the docking wedge from the display.

17. The system of claim 13, wherein the means for undocking comprises:

means for detecting whether a modifier key has been selected;

means for dragging the first panel when the modifier key is selected; and means for removing the docking wedge from the display.

18. The system of claim 13, wherein the second panel is located beyond a border of the display and the means for undocking comprises:

means for moving the second panel within the border of the display.

19. The system of claim 13, wherein the means for docking comprises:

means for dragging the first panel in proximity to the second panel; and means for modifying the dragging means to cause the docking.

20. The system of claim 19, wherein the means for dragging the first panel comprises:

cursor means displayed on the display means; and pointing means for controlling the cursor means.

21. The system of claim 13, wherein the means for dragging the docked panels comprises:

means for detecting when the first panel's header bar is selected and moved; and means for moving the second panel and docking wedge in correspondence to movements of the first panel.

22. The system of claim 13, wherein the means for zipping comprises:

means for reducing the displayed size of the first and second panels; and wherein the docking wedge is not displayed when the size of the panels is reduced.

23. The system of claim 22, wherein the means for zipping further comprises:

means for moving the first and second panels to a different location on the display.

24. The system of claim 23, wherein the different location is the upper left corner of a bounding box surrounding the first and second panels before the panels were zipped.

25. A computer program product having a computer readable medium having computer program logic recorded thereon for displaying a plurality of panels on a display of a computer system having a processor and a memory, the computer program product comprising:

means for docking the first and second panels, wherein selection of at least one button on either of said docked first and second panels operates as if a button on the other one of said docked first and second panels has also been selected; and means for displaying a docking wedge connecting the first and second panels.

26. The computer program product of claim 25, wherein the first and second panels each contain functionalities used to modify a document stored within the memory.

27. The computer program product of claim 26, wherein the functionalities are organized into sets and wherein the first and second panels are each capable of holding a plurality of functionalities.

28. The computer program product of claim 25, wherein the means for docking the first and second panels comprises:

means for dragging the first panel in proximity to the second panel;

means for detecting whether a modifier key is selected; and means for creating a docking wedge and docking the first and second panels thereon if the modifier key is selected.

29. The computer program product of claim 25, wherein the first and second panels are undocked when the docking wedge is selected.

30. The computer program product of claim 25, further comprising:

means for removing the docking wedge and undocking the first and second panels when the first panel is dragged while a modifier key is selected.

31. The computer program product of claim 25, further comprising:

means for reducing the docked panels in size in response to the selection of a minimize button, wherein the docking wedge is not displayed when the panels are reduced, and wherein a reduced first panel and a reduced second panel are displayed when the panels are reduced; and means for moving the reduced panels to a different location on the display.

32. The computer program product of claim 31, wherein said means for moving the reduced panels is operable automatically when said reducing means reduces the docked panels.

33. The computer program product of claim 25, further comprising:

means for moving the first panel when the first and second panels are docked; and means for moving the second panel and the docking wedge in correspondence to the movement of the first panel.

34. A computer system having a display, the computer system comprising:

means for displaying first and second panels on the display;

means for dragging the first panel into proximity with the second panel;

means for docking the first and second panels when the first panel is dragged into proximity with the second panel;

means for graphically indicating whether the first and second panels are docked; and means for undocking the first and second panels.

35. The computer system of claim 34, wherein the means for graphically indicating whether the panels are docked displays a docking wedge between the first and second panels when the panels are docked.

36. The computer system of claim 35, wherein the means for undocking utilizes the docking wedge.

37. The computer system of claim 34, wherein the first panel includes a minimize button, the computer system further comprising:

means for reducing the size of the docked first and second panels when the minimize button is selected.

38. The computer system of claim 37, further comprising:

means for moving automatically the reduced docked first and second panels to a position on the display different than before the first and second panels were reduced in size.

39. The computer system of claim 34, further comprising:

means for resizing the first panel; and means for reconfiguring the docked panels in response to the resized first panel, wherein the reconfigured docked panels and the graphical indication of whether the first and second panels are docked do not overlap.

40. The computer system of claim 39, wherein said reconfiguring means comprises:

means for adjusting the size of the graphical indication of whether the first and second panels are docked in accordance with the resized first panel.

41. The computer system of claim 34, wherein the first panel includes a header bar and the means for dragging comprises:

means for selecting the header bar;

means for determining whether a modifier key is selected; and wherein the means for docking only docks the panels if the header bar and the modifier key are selected concurrently.

42. The computer system of claim 34, wherein the means for undocking further comprises:

means for dragging the docked first panel;

means for determining whether a modifier key is selected; and means for undocking the first and second panels if the first panel is dragged while the modifier key is selected.

* * * * *